United States Patent
Maskovyak

[11] Patent Number: 5,274,767
[45] Date of Patent: Dec. 28, 1993

[54] PROGRAMMABLE CONTROLLER WITH MODULE IDENTIFICATION AND DIAGNOSTIC MECHANISM

[75] Inventor: George D. Maskovyak, Parma, Ohio

[73] Assignee: Allen-Bradley Company, Inc., Milwaukee, Wis.

[21] Appl. No.: 649,408

[22] Filed: Jan. 28, 1991

Related U.S. Application Data

[63] Continuation-in-part of Ser. No. 249,415, Sep. 23, 1988, Pat. No. 5,065,314.

[51] Int. Cl.⁵ .................................................. G06F 13/14
[52] U.S. Cl. ...................................... 395/275; 395/700; 395/800; 364/238.3; 364/240.1; 364/260; 364/264.1; 364/280.2; 364/284.2; 364/DIG. 1
[58] Field of Search ................ 364/DIG. 1, DIG. 2; 395/275, 325, 500, 700, 800

[56] References Cited

U.S. PATENT DOCUMENTS

| | | |
|---|---|---|
| 4,521,871 | 6/1985 | Galdun et al. ................ 395/275 |
| 4,633,392 | 12/1986 | Vincent et al. ................ 395/325 |
| 4,918,589 | 4/1990 | Floro et al. ................ 364/132 |
| 5,065,314 | 11/1991 | Maskovyak ................ 395/325 |

*Primary Examiner*—Thomas C. Lee
*Assistant Examiner*—Maria N. Von Buhr
*Attorney, Agent, or Firm*—Quarles & Brady

[57] ABSTRACT

A programmable controller has a chassis which removably holds a plurality of functional modules. The chassis has a backplane with conductors and connectors that electrically connect the modules. These conductors carry module enable, read, and write control signals, as well as byte addresses and data. Another conductor carries a signal, which when true designates that files of data, as opposed to discrete bytes of data, are being exchanged over the backplane data conductors. Each module stores identification and diagnostic data as a number of individually addressable bytes. The identification and diagnostic data is obtained from a given module by sending an active module enable signal to it. At the same time the given module is sent inactive read and write signals and an active data file transfer signal. This combination of signals is used only to read the identification and diagnostic data and is not used to exchange other types of data with functional modules.

18 Claims, 4 Drawing Sheets

PROGRAMMABLE CONTROLLER WITH MODULE IDENTIFICATION AND DIAGNOSTIC MECHANISM

This application is a continuation-in-part of U.S. States patent application Ser. No. 07/249,415 filed on Sep. 23, 1988, now U.S. Pat. No. 5,065,314.

The present invention relates to programmable controllers for operating industrial equipment, and more specifically programmable controllers into which the user can plug different functional modules to customize the controller to a specific application.

BACKGROUND OF THE INVENTION

Programmable controllers are a common type of industrial computer for operating a wide variety of manufacturing equipment, such as assembly lines and machine tools, in accordance with a stored control program. The program comprises a series of process control instructions which are read out and executed to examine the condition of selected sensing devices on the controlled equipment, and to energize or deenergize selected operating devices contingent upon the status of one or more of the examined sensing devices. Very efficient techniques have been devised for gathering input data from sensing devices and for sending output data to control the operating devices. The efficiency of these data exchange techniques is critical to the effective control of the manufacturing equipment.

In order to provide the greatest flexibility in physically configuring a programmable controller for operating a specific piece of manufacturing equipment, a programmable controller typically consists of a rack with a number of slots into which various functional modules can be inserted. A backplane of the rack has connectors in each slot and conductors which electrically couple all of the functional modules allowing for the exchange of control and data signals there between. Modules have been developed to perform a wide variety of functions, such as I/O modules which interface to the sensing and operating devices or modules which enable communication with other programmable controllers. Certain I/O modules are classified as discrete I/O modules, in that they convert signals for a set of discrete sensing and operating devices on a controlled machine or process. The operation of the discrete I/O device is associated with a single (discrete) electrical signal. This signal is generated at two different signal levels to represent the ON state and the OFF state of an input device or to control the ON state or the OFF state of an output device. Typical discrete input devices include pushbuttons, limit switches, and relay contacts. Common discrete output devices include solenoids, energizing coils in electromagnetic relays and actuating sections of solid state relays.

The digital values for discrete I/O devices can be combined into eight-bit groups known as "bytes" and communicated to and from a programmable controller processor during an I/O scan routine in which each I/O module is addressed in turn for data transfer.

The term "word" as used in this document is a broad term encompassing data groups of four bits, eight bits, sixteen bits (two bytes) or other sizes used in the computer arts, while the term "byte" refers to a unit of data with a specific size of eight bits. The term "file" shall refer to a group of data with two or more bytes of data associated with a single starting address in memory or a single I/O address. A file of data is contrasted to a group of discrete bytes of data in that a single address is used to access a file, whereas separate addresses are used to access each discrete byte of data.

Another category of I/O modules known in the art of programmable controllers are word-oriented I/O modules. These require conversion of an A.C. or a D.C. analog signal level to at least an eight-bit digital value and sometimes to ten-bit or twelve-bit digital values. With the introduction of word-oriented modules, additional methods of I/O communication have been developed to transfer many bytes of I/O data in a single block or file between an individual I/O module and the programmable controller processor. For example, when a temperature sensor is connected to the programmable controller, a module must convert its analog signal representing the sensed temperature into a multiple bit digital value. This digital representation of the temperature may be greater than eight bits in resolution requiring at least two bytes of data to be sent between the I/O module and the programmable controller processor in order to convey the sensed temperature to the processor. Other I/O modules have been developed to acquire information from conventional bar code readers or RF transponder tag readers and provide that information to the programmable controller processor. In these cases, many bytes of data may have to be used to represent that information.

Depending upon the particular type of manufacturing equipment or process to be controlled, the user is able to select from a wide inventory of different types of I/O modules and modules for performing additional functions. Thus, a variety of different types of modules may be incorporated into any single programmable controller. It is important that the processor module have a record of the exact types of modules placed in each slot of the rack so that proper communication can be established between the processor and each functional module in the rack. Heretofore, this information about the I/O modules typically was manually provided by the user entering the data into a terminal coupled to the processor module. This manual process was error prone in that the user may enter a wrong module designation. In addition, during system maintenance or replacement of a defective module, the wrong type of module could be placed in a given slot, thus, conflicting with the configuration information stored in the processor.

Furthermore, modules of a given type are periodically revised in terms of both hardware and software which is executed in the module. Such revisions may alter the operation of the module in a way which must be recognized by the processor module so that proper communication and operation can occur.

As I/O modules became more sophisticated, a certain degree of error detection was incorporated within them. In order to take full advantage of the internal diagnostic capabilities being incorporated into these sophisticated I/O modules, a mechanism should be provided to enable the processor module to detect the results of such diagnostics, which are not part of the normal discrete I/O data exchanged between the modules. However, the proper control of the manufacturing equipment or process may require rapid access to the input data from the sensing devices and the rapid output of control data to the operating devices. This access to the sensing and operating devices in many critical control processes might be adversely affected by the acquisition of diagnostic data from the functional modules unless proper safeguard procedures against such adverse affects were not incorporated into the programmable controller.

SUMMARY OF THE INVENTION

A programmable controller includes a processor section to execute instructions of stored control programs. Sensing and operating devices of the controlled equipment are connected to a plurality of input and output modules that are electrically coupled to the processor section. The processor module executes a series of user defined control programs which examines the status of selected sensing devices and sets the state of the actuating devices in accordance with the examined status based on the logical operations defined by the control program.

The programmable controller further includes a functional module for exchanging data with the processor module over a set of buses which includes a data bus, and address bus, a read signal conductor, a write signal conductor, a module enable signal conductor and an identification enable signal conductor. The functional module comprises a means for storing a plurality of data bytes which identify characteristics of the functional module. A means is also provided for transmitting the data identifying characteristics of the functional module over the data bus in response to logically true signals on the module enable signal conductor and the identification control signal conductor. The transfer of identifying characteristics also occurs in response to logically false signals on the read and write signal conductors, and an address signal on the address bus identifies one of the plurality of data bytes to be transmitted.

In the preferred embodiment, the data bytes identifying characteristics of the functional module include bits which indicate whether the module is functional and whether a predefined error condition has occurred. Some of the bytes may also identify the type of functional module and its version.

DETAILED DESCRIPTION OF THE PREFERRED EMBODIMENT

A. Programmable Controller System

Figure 1:
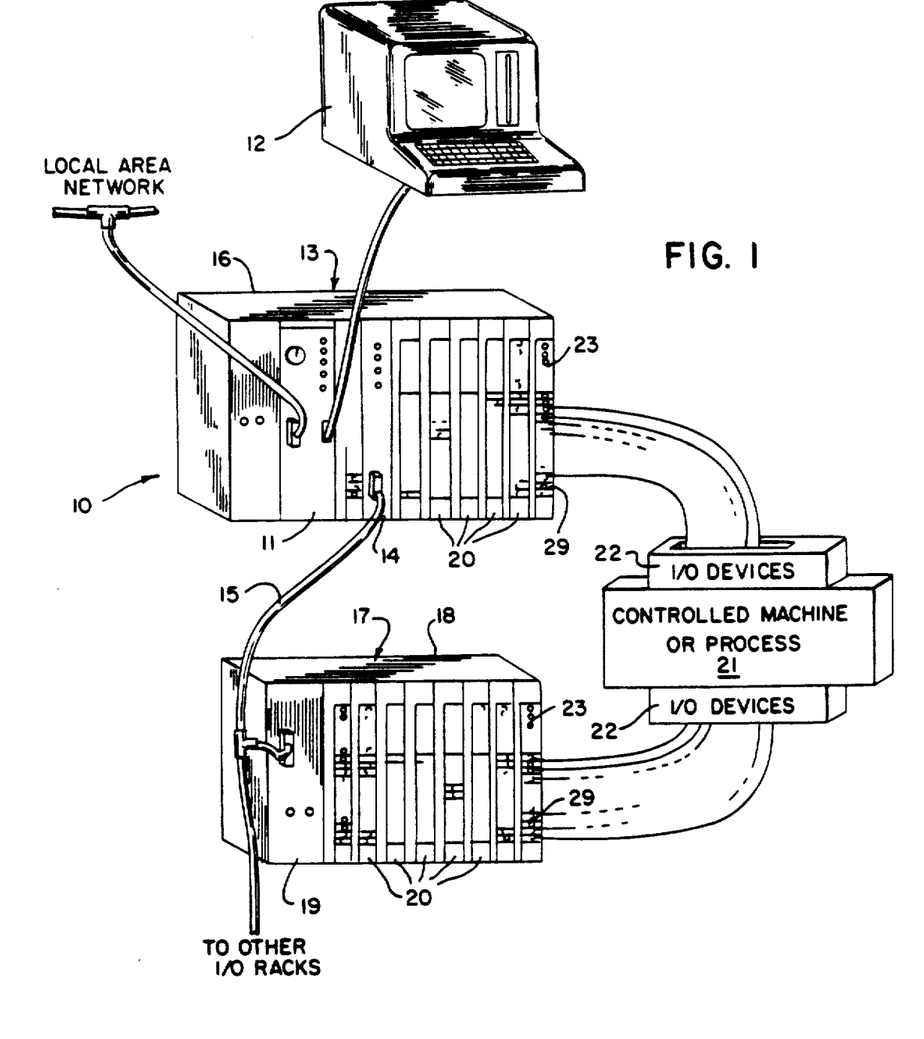
FIG. 1 is a perspective view of a modular programmable controller system which includes the circuitry in the present invention.

In FIG. 1, a programmable controller (PC) system includes a modularized PC system chassis 10 having a group of modules supported and connected in a system chassis. One of these modules is a PC system processor module 11 for executing user application programs to control a machine or process schematically represented by block 21. With earlier controllers these application programs were seen on the screen of programming terminals as "ladder diagrams". In recent years, however, other symbolic user application languages have been developed. The user application program applies control logic in examining input data and setting output data in an I/O image table. The output data and input data are communicated to and from I/O devices 22 to carry out the actual sensing and controlling of conditions on the machine or process 21. Input data represents the sensed state or condition of input devices 22 on the machine or process, while output data represents the commanded state or condition of output devices 22 on the machine or process. The more general term "I/O devices" shall refer to input devices or output devices, or a combination of the two, and the more general term "I/O data" shall mean input data or output data or a combination of the two.

To effect control of the I/O devices 22, the processor module 11 sends output data and receives input data through a communication path to and from the I/O devices. This communication path includes a system backplane 16 connecting the PC system processor module 11 to a number of I/O interface modules 20 in the system chassis 13. The system chassis alone may not be sufficient to hold enough I/O modules for a large machine. In which case a remote I/O chassis 17 is provided. The communication path to the I/O modules 20 in the remote I/O chassis 17 includes a remote I/O scanner module 14, coupled to the system backplane 16 to further communicate data through a serial data link 15 to a remote I/O adapter module 19 in the remote I/O chassis.

The processor module 11 and I/O modules 20 are inserted into physical slots in the system chassis 13 and connect through back edge connectors (not shown) on a backplane circuit board 16 extending across the back of the chassis. In a similar manner, the I/O adapter module 19 and the other I/O modules 20 are received in slots of the remote I/O chassis 17 being electrically connected to a backplane 18 of that chassis. The I/O adapter module 19 is located in the leftmost slot and eight I/O modules 20 are placed in eight slots to the right of the I/O adapter module 19. Both chassis 13 and 17 further include a power supply (not shown) which furnishes electrical power to the modules.

An I/O module 20 in the system chassis 13 interfaces through backplane 16 with the system processor 11 which acts as a backplane controller supervising access to the backplane by the modules. Alternatively, if the I/O module is located in the remote I/O chassis 17, the adapter module 19 acts as that chassis's backplane controller as well as handling the exchange of data through the serial data link 15 and the I/O scanner module 14 with the PC system processor 11.

The machine or process 21 is controlled through the I/O devices 22 which are electrical and electromechanical devices such as relays, solenoids, limit switches, motor starters and pushbuttons. These devices are connected by individual wires to terminals on front edge connectors 29. The front edge connectors 29 are electrically and mechanically connected to the front edges of circuit boards (not shown) which are exposed along the front sides of the I/O modules 20. The I/O modules 20 include light emitting diodes 23, located above the connectors 29, for signalling the status of certain outputs as being ON or OFF.

It should be understood that the system chassis 13 and the remote I/O chassis 17 are available in other sizes for accommodating different numbers of I/O modules 20, respectively. For example, each chassis may have up to sixteen slots. Although eight slot chassis are shown in FIG. 1 for ease of illustration, the description of the present invention hereinafter, especially with respect to module addressing, will be based on sixteen slot racks.

B. I/O Module Operation

Typical input and output modules 20 provide five broad functions for a programmable controller system. First, I/O modules provide physical connection between the I/O devices 22 on the controlled machine or process 21 and the programmable controller 10. Second, I/O modules provide signal-level conversion between the AC or DC signals used by the I/O devices and the electronic signals used within the programmable controller system. Third, the I/O modules provide a human observer with a visual indication of the operation of the electronic circuitry. Fourth, the I/O modules provide an isolation interface between the power signals on the controlled machine or process 21 and the electronic signals within the controller. And fifth, the I/O modules provide multiplex electronics to construct "pictures" or "maps" of conditions of the I/O devices and of the system processor's decisions and actions.

The first function, the physical connection between the I/O devices 22 and the programmable controller is provided by the connectors 29 in FIG. 1. The third function, visual status indication, is provided by the light emitting diodes 23 in FIG. 1.

Figure 2:
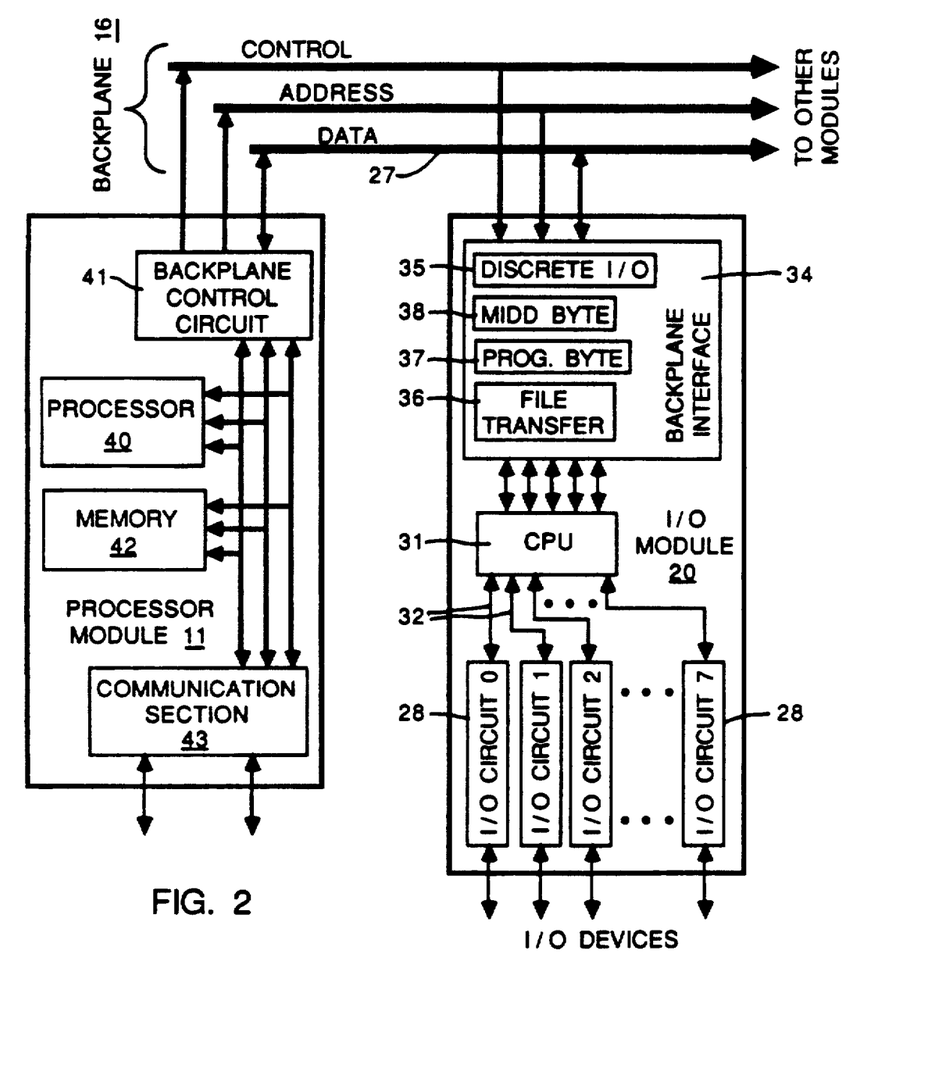
FIG. 2 is a block schematic diagram of a processor module and an I/O module in FIG. 1 which incorporates the circuitry of the present invention.

The second and fourth functions for the I/O modules 20, signal-level conversion and electrical isolation, are provided by eight bidirectional I/O circuits 28 (I/O CIRCUITS 0-7) seen in FIG. 2. In an AC embodiment of an I/O module, I/O CIRCUITS 0-7 sense the ON or OFF state of input devices and control the ON or OFF state of output devices supplied with a nominal AC voltage of 120 AC volts. Each I/O circuit 28 has two inputs (AC and COM, not shown) for receiving the 120-volt AC signal as well as an input (IN, not shown) for connection to the low side of a sensing device and an output (OUT) for connection to the high side of the operating device (all not shown). The output is protected by a fuse (not shown) against overload currents. The invention is also applicable to I/O modules 20 in which the input and output devices 22 are powered from a DC source (not shown) with a nominal DC voltage of 24 volts (low range of operation) or a nominal DC voltage of 48 DC volts (high range of operation).

The I/O circuits 28 are bidirectional in that each circuit can sense one input and control one output. Because the I/O circuits 28 sense and control input and output devices 22 with individual operating signals, the data or digital signals which are converted to and from these operating signals are referred to as "discrete" I/O data. The I/O circuits 28 are also sometimes referred to as I/O points (for connection of I/O devices). In this example, there are eight outputs and eight inputs on the I/O module 20 in FIG. 2, and these can be considered as eight bidirectional I/O points or sixteen unidirectional I/O points.

A microelectronic central processing unit (CPU) 31 is connected through eight line sets 32 to the eight respective I/O circuits 28. Each line set 32 includes a line for serial transmission of data and lines for a group of control signals such as system clock, read clock, write clock, program/run mode and chip enable. The microelectronic CPU 31 simultaneously reads or writes eight bits—one bit for each of the I/O circuits 28. It reads or writes to the I/O circuits 28 eight times to transfer a byte for each I/O circuit. For a detailed description of the I/O circuits 28, reference is made to an article of Frank Goodenough entitled "Chips Isolate Host Processors from the Power They Control" in *Electronic Design*, Jun. 23, 1988, pages 52-58.

The commercial circuit used as the microelectronic CPU 31 in the preferred embodiment is the 80C31 Microcomputer manufactured and sold by Intel Corporation, Santa Clara, Calif. This circuit has 128 bytes of random access memory on-board for storing temporary data and results. The CPU is operated under the direction of a program stored in an internal programmable read only memory (PROM). Manuals describing the architecture, operation and programming of this circuit are available in the form of commercial literature from Intel and in other publications. It is contemplated that in other embodiments other commercial CPU's will be used.

The microelectronic CPU 31 communicates in three modes with I/O CIRCUITS 0-7: 1) a program mode, 2) a run output mode and 3) a run input (diagnostic) mode. In the program mode, each I/O circuit 28 receives a serially transmitted programming byte from the CPU 31. The programming byte includes bits which are defined as seen in the following Table 1.

TABLE 1

| PROGRAMMING BYTE TO I/O CIRCUITS (28) | |
|---|---|
| BIT | DESCRIPTION |
| 0 | Voltage Range Select (DC) |
| | 0 = Low Range (24 V DC) |
| | 1 = High Range (48 V DC) |
| | In an AC module this bit is always zero |
| 1,2 | Input Filter Time Constant |
| | 00 = 25 msec (AC)/125 μsec(DC) |
| | 01 = 50 msec (AC)/1 msec (DC) |
| | 10 = 75 msec (AC)/4 msec (DC) |
| | 11 = 100 msec (AC)/16 msec (DC) |
| 3,4 | Output Overcurrent Level Select |
| | 00 = 3.1 Amps Peak(AC)/2.4 Amps Peak(DC) |
| | 01 = 6.0 Amps Peak(AC)/4.0 Amps Peak(DC) |
| | 10 = 17 Amps Peak(AC)/12 Amps Peak(DC) |
| | 01 = 28 Amps Peak(AC)/20 Amps Peak(DC) |
| 5 | Output Fault Mode |
| | 0 = Maintain Last State |
| | 1 = Reset Output |
| 6,7 | Not Used |

The microelectronic CPU 31 determines the bits for the programming bytes (not shown in FIG. 2) to be sent to the I/O circuits 28 based on I/O configuration bytes which the CPU 31 receives from the system processor module 11. The I/O configuration bytes are received from the system processor as the low bytes of 16-bit words in an 8×16-bit file. This file is transferred from the CPU 31 via one of the file transfer modes to be described below. An I/O configuration byte from the CPU 31 and applicable to one I/O circuit 28 is defined in Table 2 below.

TABLE 2

| I/O CONFIGURATION BYTE FROM SYSTEM PROCESSOR | |
|---|---|
| BIT | DESCRIPTION |
| 0 | Output Fault Mode |
| | 0 = Maintain Last State |
| | 1 = Reset Output |
| 1,2 | Input Filter Time Constant |
| | 00 = 25 msec (AC)/125 μsec(DC) |
| | 01 = 50 msec (AC)/1 msec (DC) |

TABLE 2-continued

| I/O CONFIGURATION BYTE FROM SYSTEM PROCESSOR | | |
|---|---|---|
| BIT | DESCRIPTION | |
| | 10 = 75 msec (AC)/4 msec (DC) | |
| | 11 = 100 msec (AC)/16 msec (DC) | |
| 3 | Output Pulse Test Enable | |
| | 0 = Disabled | |
| | 1 = Enabled | |
| 4 | Output Wire Disconnect Enable | |
| | 0 = Disable | |
| | 1 = Enable | |
| 5 | Input Wire Disconnect Enable | |
| | 0 = Disable | |
| | 1 = Enable | |
| 6,7 | Not Used | |

Comparing Tables 1 and 2, the input filter time constant (bits 1 and 2) is passed through the microelectronic CPU 31 to the I/O circuits 28. The output fault mode bit is also passed through the microelectronic CPU 31 but its bit position is changed from bit 0 in Table 2 to bit 5 in Table 1. The output pulse test mentioned in Table 2 is a test to reverse the state of an output circuit for 100 microseconds to insure the the output driver in the I/O circuit 28 is functioning properly. This parameter is not seen in Table 1 because it is transmitted to the I/O devices 22 in the run output mode, which will be defined in relation to Table 3 below.

The "input wire disconnect" test and the "output wire disconnect" test are conducted to determine whether an input device or an output device 22 has become disconnected from the terminals on the I/O module connectors 29 in FIG. 1. I/O CIRCUITS 0-7 are wired to provide a small residual current even when an I/O device is in the OFF state. Loss of this residual current means that the I/O device 22 has become disconnected. The I/O configuration bytes sent to the microelectronic CPU 31 contain bits to enable these tests, but the actual data resulting from the tests is read during the run input (diagnostic) mode, so there are not bits to send to the I/O circuits 28 in the programming bytes of Table 1.

The microelectronic CPU 31 transmits several serial bits to each of the I/O circuits 28 in the run output mode and these are defined in Table 3 as follows.

TABLE 3

| RUN OUTPUT MODE BITS TO I/O CIRCUITS | |
|---|---|
| BIT PATTERN | DESCRIPTION |
| 001 | TURN OUTPUT OFF |
| 110 | TURN OUTPUT ON |
| 011 | PULSE TEST |

In the run mode, each I/O circuit 28 responds to the above bit patterns by sending an input byte back to the microelectronic CPU 31. The input byte includes the ON or OFF state of any input device connected to the I/O circuit 28 in the "bit 0" position of this input byte. Diagnostic bits for the input device, which are to be distinguished from the ON and OFF state data, are included as "bits 1-6" in the input byte. A parity bit for checking data transmission is included as "bit 7" in the input byte as seen in the following Table 4.

TABLE 4

| DIAGNOSTIC BYTE FROM I/O CIRCUITS | |
|---|---|
| BIT | DESCRIPTION |
| 0 | ON or OFF state of input |
| | 0 = OFF |
| | 1 = ON |
| 1 | Input Wire Disconnected |
| | 0 = No |
| | 1 = Yes |
| 2 | Communications Fault |
| | 0 = No fault |
| | 1 = Not receiving data from processor |
| 3 | Output Wire Disconnected |
| | 0 = No |
| | 1 = Yes |
| 4 | Output Overcurrent |
| | 0 = No |
| | 1 = Yes |
| 5 | Output Over Temperature |
| | 0 = No |
| | 1 = Yes |
| 6 | Output Failed to Follow Command |
| | 0 = No |
| | 1 = Yes |
| 7 | Odd Parity Bit |

The microelectronic CPU 31 forms an 8×16-bit file of diagnostic data based on the input data read from the I/O circuits 28. The high byte in each 16-bit word is not utilized. The low byte of each 16-bit word is a diagnostic byte for the set of I/O circuits 28. The diagnostic bytes are bit-mapped to report one condition for each of the eight I/O circuits. Thus the low bytes of the diagnostic file are defined as seen in the following Table 5.

TABLE 5

| DIAGNOSTIC BYTES FROM I/O CPU (31) | |
|---|---|
| LOW BYTE | DESCRIPTION |
| Word 1 | Diagnostic Information Byte |
| Word 2 | Input Wire Disconnected (8 inputs) |
| | 0's = No |
| | 1's = Yes |
| Word 3 | Communications Fault (8 outputs) |
| | 0's = No fault |
| | 1's = Not receiving data from processor |
| Word 4 | Output Wire Disconnected (8 outputs) |
| | 0's = No |
| | 1's = Yes |
| Word 5 | Output Overcurrent (8 outputs) |
| | 0's = No |
| | 1's = Yes |
| Word 6 | Output Over Temperature (8 outputs) |
| | 0's = No |
| | 1's = Yes |
| Word 7 | Pulse Test Failed (8 outputs) |
| | 0's = Yes |
| | 1's = No |
| Word 8 | Output Failed to Follow Command (8) |
| | 0's = No |
| | 1's = Yes |

In processing the data transmitted to and received from I/O circuits 0-7, the microelectronic CPU 31 performs the fifth function mentioned above for I/O modules, multiplexing and demultiplexing the real time I/O data to and from the I/O image table to provide high speed "pictures" or "maps" of conditions of the I/O devices 22 and of the system processor's decisions and actions.

The microelectronic CPU 31 multiplexes or combines the eight bits of discrete input data from the eight I/O circuits 28 into a single byte of discrete I/O data. A backplane interface circuit 34 in the I/O module 20 then send this byte over a parallel data bus 27 of the system chassis backplane 16 in a single transmission or time frame. The microelectronic CPU 31 also receives a byte of discrete output data over the backplane data bus 27 in a single transmission or time frame. The CPU 31 then demultiplexes or distributes the eight bits to the eight respective I/O CIRCUITS 28.

In this example the discrete I/O data is handled as "single byte" transfer data. This single byte data is subject to a higher frequency of communication with the PC system processor module 11 than the file transfer data. This is because the discrete I/O data is controlling an operating machine or process in real time. In order for the controller to be "faster" than the mechanical activities on the machine or process, discrete I/O data must be communicated at a high frequency. The update rate for addressing all I/O modules 20 in a programmable controller system is referred to as the I/O scan rate. There may also be longer update rates or scan rates for actually transferring files of data to a file-transfer type module.

The microelectronic CPU 31 also reads in the diagnostic bytes from the respective I/O CIRCUITS 28, extracts the applicable data and packs it into eight bytes of a sixteen-byte file to be sent back to the PC system processor 11.

The microelectronic CPU 31 receives a file including eight programming bytes, extracts the applicable data and distributes it to the respective I/O CIRCUITS 0-7.

The programming and diagnostic data is communicated through the backplane as file transfer data which it requires less frequent communication to and from the PC system processor 11 than the discrete I/O data.

The backplane interface circuit 34 relieves the CPU 31 of many functions related to communication with a PC system processor module 11 or an adapter module 19 through the chassis backplanes 16 and 18. The microelectronic CPU 31 reads and writes bytes of discrete I/O data to storage locations 35 in the backplane interface circuit. The backplane interface circuit 34 transfers a discrete input byte to the PC system processor module 11 and stores a discrete output byte from the processor module in these storage locations 35. The two-way signalling sequence employed to exchange the discrete data is referred to as the I/O SCAN mode of backplane communication and will be described in greater detail.

The I/O module 20 also exchanges files of data in either direction over the backplane 16. The files received from the processor module 11 are stored in locations 36 in the backplane interface circuit 33 until the CPU 31 is able to process the data. When the CPU 31 has a file of data to send to the PC system processor module 11, the data is placed in storage locations 36 for the backplane interface circuit 33 to transmit over the backplane 16. The files in location 36 contain the programming bytes and location 38 continues diagnostic bytes for I/O CIRCUITS 0-7. The backplane interface circuit 33 handles matters of timing and protocol related to the file transfer through the backplane 16.

While the microelectronic CPU 31 is relieved of many of the details of communication, it retains control over the backplane interface circuit 34 by initiating certain actions and providing certain responses during backplane communication.

During start up and initialization of the I/O module 20, the microelectronic CPU 31 sends a backplane programming byte to the backplane interface circuit 34. The microelectronic CPU 31 originates the programming byte in response to parameters which it reads as constants from the internal programmable read only memory (not shown) in the CPU. The programming byte from the microelectronic CPU 31 is "dead ended" (communicated no further) by the backplane interface circuit 34, where it is latched in hardware 37. The stored programming byte generates a set of logic signals which select conditions during single byte transfer mode when interrupt signals will be generated to the CPU 31. The programming byte is defined as seen in Table 6 below.

TABLE 6

PROGRAMMING BYTE FROM CPU (31)
TO BACKPLANE INTERFACE CIRCUIT (33)

| BIT | DESCRIPTION |
|---|---|
| 0 | File Transfer Mode |
|  | 0 = FT Mode 1 |
|  | 1 = FT Mode 2 |
| 1,2 | File Transfer Mode/Bytes-Single Transfer |
|  | 00 = FT Mode 1 only/0 bytes |
|  | 01 = FT Mode 1/2 bytes |
|  | 10 = FT Mode 1/4 bytes |
|  | 11 = FT Mode 1/8 bytes |
| 3 | Debug (Interrupt on FT Data Complete) |
|  | 0 = OFF |
|  | 1 = ON |
| 4 | Interrupt for each 2 bytes sent to backplane controller |
|  | 0 = Disable |
|  | 1 = Enable |
| 5 | Interrupt when all single transfer bytes sent to backplane controller |
|  | 0 = Disable |
|  | 1 = Enable |
| 6 | Interrupt when all single transfer bytes received from backplane controller |
|  | 0 = Disable |
|  | 1 = Enable |
| 7 | Interrupt when 2 bytes received from backplane controller |
|  | 0 = Disable |
|  | 1 = Enable |

As seen in Table 6 bit 0 determines whether File Transfer (FT) Mode 1 or File Transfer Mode 2 is to be used to communicate file transfer data through the backplane. Where File Transfer Mode 1 is selected, there are several different possible capacities for single transfer data and these are determined by bits 1 and 2. Where File Transfer Mode 2 is selected, the 8-byte capacity for single transfer data is also selected. The present I/O module 20, for example requires only a 2-byte capacity for single byte transfers. When I/O modules 20 are used with existing system processor and adapter modules, the address of the first single byte becomes the address for transfer of file data and the address for the second single byte becomes the address for transfer of discrete I/O data.

C. Backplane Data Communications

As seen in FIGS. 1 and 2, an I/O module 20 incorporating the present invention interfaces through the I/O chassis backplane 16 with the system processor 11 which acts as the backplane controller. Alternatively if the I/O module is located in the remote I/O chassis 17, the adapter module 19 acts as that chassis's backplane controller as well as handling the exchange of data through the serial data link 15 and the I/O scanner module 14 with the PC system processor 11.

For the purposes of the description herein, the I/O scanner module 14 and adapter module 19 may be considered "transparent" to the operations between the PC system processor 11 and I/O chassis 17. The signals generated on the backplanes 16 and 18 originate either in a PC system processor 11 or an adapter module 19, and the term "backplane controller" shall be used to mean one of these modules placed in the chassis for which the signals are being described.

An exemplary PC system processor module 11 includes a microelectronic processor 40 and a memory 42 that stores real time discrete data in an I/O image table. A backplane control circuit 41 regulates module access to the backplane 16. The adapter module 19 also includes these elements, so that discrete I/O data can be received, buffered and then transmitted across the backplane 18 just as if the PC system processor module was located in the leftmost slot of the I/O chassis 17. However, the PC system processor 11 also has a communication section/which controls the exchange of data with the programming terminal 12 and over the local area network.

File transfer (FT) data, also known as block transfer file data, is stored in another area of the PC system processor memory 42 from the discrete I/O data, I/O data table. The FT data is communicated through a corresponding buffer area of memory in the adapter module 19. File transfers are described in Struger et al., U.S. Pat. No. 4,293,924.

The I/O image table stored in memory 42 of the PC system processor 11 is memory mapped to system I/O addresses which are assigned to the I/O modules 20 in a user programming language. These addresses correspond one-to-one with locations in the I/O image table, and thus the term "image" is part of the name "I/O image table". These I/O addresses are observed as octal numbers displayed in the graphical type of user application program which is typically used. The location of the I/O modules 20 at remote locations and the communication over the serial data link 15 does not change this relationship.

As an example of the user addressing system, it shall be assumed that a byte of data is stored at user location 0101 (octal) in the image table. This byte is a byte of output data (the first "0" meaning "output") to be transferred to Rack 1 (the first "1" from the right meaning "rack 1") Module Group 0 (the second "0" meaning module group "0") High Byte (the second "1" meaning "high byte"). Because the image table is considered to have sixteen-bit words, each module group contains a high byte and a low byte in the image table. The high byte/low byte address is converted by the controller to an address signal during the I/O scan, so that each byte is associated with a unique system I/O address. Module Group "0" is considered to include two eight-bit capacity I/O modules placed side-by-side in two physical slots with one receiving the high byte and the other receiving the low byte from the sixteen-bit location in the image table.

Figure 3:
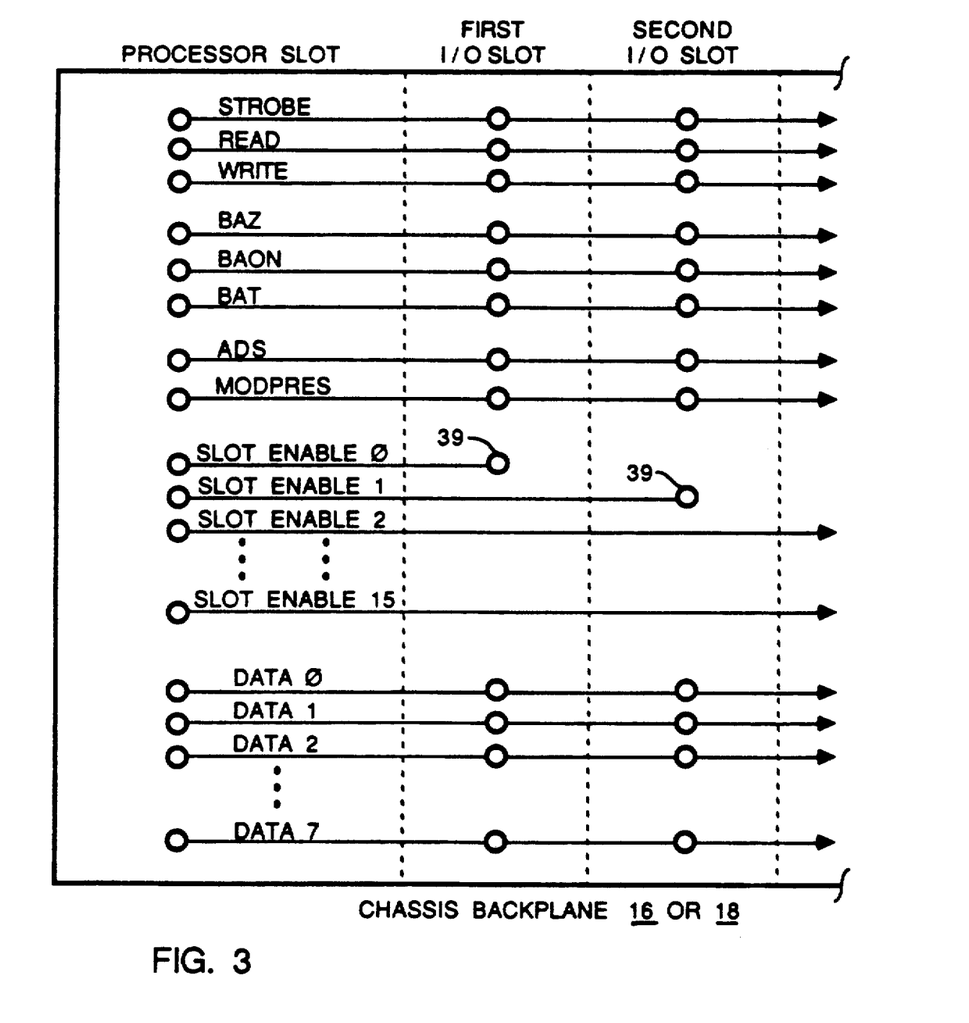
FIG. 3 is a schematic of a portion of the backplane of the equipment chassis shown in FIG. 1.

Backplanes 16 and 18 in chassis 13 and 17 respectively are printed circuit boards with ADDRESS, DATA and CONTROL lines as shown more particularly in FIG. 3. The backplane 16, for example, allows a memory area of (8 words × 16 bits) to be mapped to sixteen slots for 8-bit modules. The high byte/low byte signal is the low order bit in a four-bit binary address which is decoded by a slot decoder in the backplane control circuit 41 to activate one of sixteen slot enable lines (0-15) on the backplane 18. One of these slot enable lines runs to a back edge termination area 39 in each slot which connects to a corresponding terminal on an I/O module placed in the slot. The other backplane signal lines are connected to back edge termination areas in every slot of the chassis.

In a multi-chassis system, the user I/O address would also include an octal rack address. This number would also be decoded to select or address one of seven I/O chassis and to enable the slot address to be communicated to the backplane 18.

The slot enable lines, eight lines for a data bus (DATA 0-DATA 7), the READ line, the WRITE line and the STROBE line. Other previously known lines are also present on the backplane, but these have not been shown as not being essential to the understanding of the present invention. The present backplane is distinguished from earlier chassis backplanes by the addition of an ADS control line.

With reference to FIGS. 2 and 3, the backplane 16 or 18 accommodates earlier system processors 11 and adapters modules 19 (i.e. backplane controllers) that do not utilize the new ADS control line. For these earlier system processor and adapter modules, the I/O module backplane interface circuit 34 provides for multiple-byte transfers of discrete I/O data to the same I/O module 20 during an I/O scan by interpreting signals on a byte address bus (BA$\phi$, BA1 and BA2) as disclosed in Struger et al., U.S. Pat. No. 4,691,296. In addition, this interface circuit 34 provides for file transfers according to the file transfer method taught in Struger et al., U.S. Pat. No. 4,293,924 (the Struger '924 patent). This allows the I/O module 20 to remain compatible with existing system processors and adapter modules which utilize the BA$\phi$, BA1 and BA2 address lines and which do not use an ADS control line included in newly developed system processor and adapter modules.

For these earlier system processor and adapter modules, the lines BA$\phi$ (byte address 0), BA1 (byte address 1) and BA2 (byte address 2) have been included on the chassis backplanes 16 and 18 to handle addressing of eight system I/O addresses on a single I/O module. These lines run across the full backplane connecting to each I/O module and carrying a three-bit byte address ranging from "000" to "111".

During discrete I/O scans which transfer separate bytes of data, the three-bit byte address can be transmitted in conjunction with any one of the sixteen slot enable signals, so that (16 × 8) bytes can be transmitted to one I/O chassis, an eight fold increase over I/O chassis without the byte address lines. The byte address on lines BA$\phi$, BA1 and BA2 is decoded on the I/O module 20, that is activated by a signal sent over the appropriate slot enable line, to select which one of up to eight discrete I/O bytes is being transferred.

The file transfer method of the Struger '924 patent utilized a module control byte (MCB) which had to be separately identifiable from the real time I/O data transferred during the discrete I/O scan. To implement this method, the module control byte is stored in the I/O image table in the location that would otherwise be occupied by a byte of discrete output data. The MCB is sent to the I/O chassis slot where a file transfer type module is located. The byte is interpreted by the recipient I/O module as control information rather than as discrete I/O data because a discrete I/O module is not in the slot to recognize discrete I/O data. The receipt of the MCB caused the module to commence a file transfer in the direction indicated by which one of the READ or WRITE lines carry a logically true signal.

More recently, complex I/O modules 20 have been developed which generate a discrete I/O byte as well as larger blocks of data and which are capable of transferring both discrete I/O data and file transfer I/O data. To accommodate these complex modules, system processor and adapter modules (i.e. backplane controllers) were created which utilize a different technique for exchanging data over the backplane so that both a discrete byte and data files can be exchanged with the same I/O module. The logic level applied by the backplane controller to the newly added backplane ADS control line, and not the transfer of a MCB, distinguishes the discrete byte transfer mode from the data file transfer mode for these newer I/O modules. The backplane interface 34 in the selected I/O module 20 is activated by a logically true slot enable signal and responds to the signal level on the ADS control line by entering either the discrete byte transfer mode or the file transfer mode.

Figure 4:
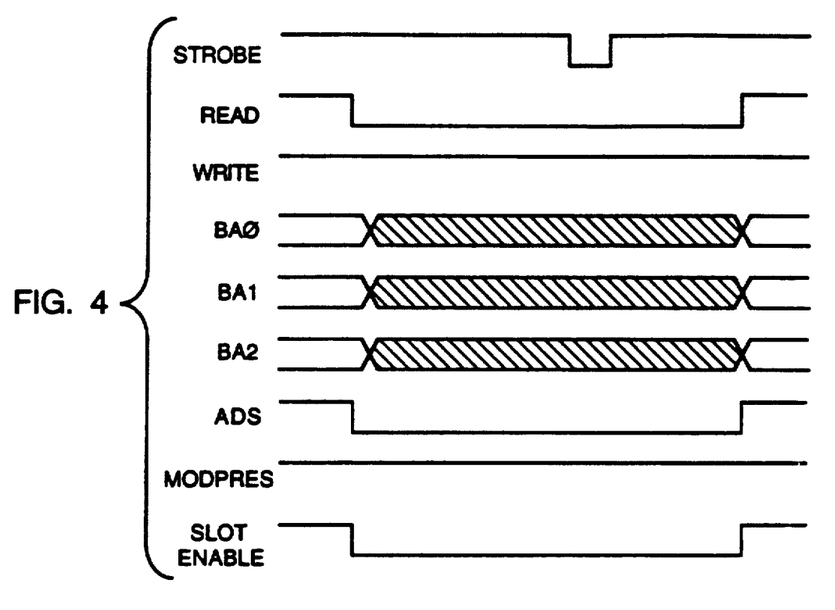
FIG. 4 is a timing diagram illustrating signals applied to read a file of data from a functional module.

In the case of an ADS file transfer operation, the backplane control circuit 41 in the backplane controller detects the execution of a PC-system level file transfer programming instruction of a type known in the art. This instruction includes a system I/O slot address which is the same system I/O slot address where discrete I/O data is communicated. The machine-level instructions in the PC system processor module 11 have been modified, so that when the file transfer programming instruction is executed, the "file transfer" function is detected and a logically true (low level) signal is transmitted on the ADS control line to signal a file transfer. At the same time a logically true (low level) signal is sent over either the READ signal line or the WRITE signal line depending upon the direction of the file transfer, and the STROBE line initially carries a logically false (high level) signal. These signals for reading a file from an I/O module 20 are illustrated in FIG. 4. The signals on the BAφ, BA1 and BA2 lines address the storage location in the I/O module 20 from which the data file is to be read. The module in the enabled slot responds to these signals by transferring the appropriate information over the data lines (DATA 0-DATA 7 of the backplane. To transfer a file to the I/O module a similar operation is employed, except the READ signal becomes false (high level) and the WRITE signal goes true (low level). After a delay period, sufficient for the I/O module to access the addressed data, the STROBE line goes true (low) causing the module to store the data then being carried by backplane data lines, DATA 0-DATA 7.

The discrete byte transfer (I/O SCAN) mode is carried out in response to other machine-level instructions in the PC system processor module 11, which are executed after each execution cycle of the ladder diagram program. When the machine-level instructions are executed for the I/O SCAN mode, a logically false (high) signal is transmitted on the ADS line to indicate the single byte transfer mode. The SLOT ENABLE, READ and WRITE lines select the module and designate the direction of data transfer. During the discrete I/O scan, each single byte storage location is addressed twice, once during an input scan and once during an output scan.

D. Module Identification and Diagnostics

With continuing reference to FIG. 2, the I/O module 20 also can provide upon request data to the PC system processor module 11 indicating the present operational status of the module and identifying the exact type of I/O module. In order to accomplish this function, each module 14 and 20 stores eight bytes of data that are collectively referred to as Module IDentification and Diagnostic bytes or simply "MIDD bytes". Upon power-up of the programmable controller system and at other times as required, the PC system processor module reads some or all of the MIDD bytes from an I/O module 20. In the case of module 14 or 20 contained in the system chassis 13 the MIDD byte is read directly from the module across the backplane 16. However, for an I/O module 20 in the remote chassis 17, the MIDD byte is obtained by the adapter module 19 and sent over the serial data link 15 to the I/O scanner module 14 and then across the system chassis backplane 16 to the PC system processor module 11.

The first MIDD byte (MB0) is referred to as a dynamic byte as each of its bits change states depending upon operating conditions of the I/O module 20. This byte is defined as seen in the following Table 7.

TABLE 7

| BIT | MIDD BYTE 0 DESCRIPTION |
|---|---|
| 0 | I/O Module Functional |
|   | 0 = NO |
|   | 1 = YES |
| 1 | Request to obtain a data file from PC System Processor Module (11) |
|   | 0 = NO |
|   | 1 = YES |
| 2 | Request to send a data file to PC System Processor Module (11) |
|   | 0 = NO |
|   | 1 = YES |
| 3 | Module Fault |
|   | 0 = NO |
|   | 1 = YES |
| 4 | Input Wire Disconnected |
|   | 0 = NO |
|   | 1 = YES |
| 5 | Output Wire Disconnected |
|   | 0 = NO |
|   | 1 = YES |
| 6 | Fuse Blown |
|   | 0 = NO |
|   | 1 = YES |
| 7 | CPU Error |
|   | 0 = NO |
|   | 1 = YES |

Bit 0 of MIDD Byte 0 indicates whether the I/O module is functioning properly. This bit will be false when the module as a whole is inoperative or when an I/O module is not present in the chassis slot from which the PC system processor module 11 attempts to read MIDD byte 0. Bit 0 is especially useful at system power-up to determine whether a functioning I/O module is in a given chassis slot. Bits 1 and 2 of MIDD byte 0 indicate to the PC system processor module 11 that the I/O module is requesting access to the chassis backplane 16 in order to transfer a data file. When the I/O module detects a fault condition, Bit 3 is true and bits 4–7 can be inspected to determine the nature of the fault. Bit 3 of MIDD byte 0 may also be set by the backplane controller when an error occurs in communication with the I/O module. Bits 4-7 summarize various conditions reported by the diagnostic bytes and identifies the applicable conditions without identifying the specific I/O circuit 28. If an error is indicated by MIDD byte 0 the appropriate diagnostic byte (see Table 5) can be read to determine the exact location of the fault.

The remaining MIDD bytes in the embodiment being described herein have constant values indicating fixed characteristics of the specific I/O module. Alternatively, some or all of these latter bytes can be dynamic representing the condition of parameters that change during the operation of the module. The values of the constant bytes are set during the manufacture of the module and are stored within the PROM of the CPU 31. The second MIDD byte (MD1) defines the types of data transfer techniques that may be use to communication with the I/O module. MIDD byte 1 is defined as seen in the following Table 8.

TABLE 8

| BIT | MIDD BYTE 1 DESCRIPTION |
|---|---|
| 0 | "ADS" File Transfer Capability |
|  | 0 = NO |
|  | 1 = YES |
| 1 | Discrete Input Data Present |
|  | 0 = NO |
|  | 1 = YES |
| 2 | Discrete Output Data Present |
|  | 0 = NO |
|  | 1 = YES |
| 3 | File Transfer Mode Capability |
|  | 0 = NO |
|  | 1 = YES |
| 4,5 | Single Tranfer Capacities |
|  | 00 = 1 byte |
|  | 01 = 2 bytes |
|  | 10 = 4 bytes |
|  | 11 = 8 bytes |
| 6,7 | Not Used |

Bit 0 of MIDD byte 1 indicates that the module has the capability of transferring data files using the ADS technique described previously. Bits 1 and 2 signal that the module possesses discrete I/O data and operates in the byte transfer mode. Bit 3 signals whether the module is a file transfer type module and bits 4 and 5 indicate the single byte transfer capacities. As noted above recent I/O modules are capable of transferring data in both the single byte and file transfer modes, thus bits 0-3 all can be set at a ONE logic level.

MIDD byte 2 identifies the function class of the I/O module as a binary member. The different classes include discrete AC or DC I/O modules, open or closed loop control modules, analog I/O modules, intelligent (e.g. microprocessor based) power control modules, I/O scanner modules, and communication network interface modules. The fourth MIDD byte (MB3) encodes the manufacturer catalog designation of the module as a binary number. Thus up to 255 different catalog designations of modules in each function class can be identified. The combination of MIDD bytes 2 and 3 provide a unique identification of the module type.

MIDD bytes 4 and 5 identify the revisions of the module's hardware and firmware. The remaining two MIDD bytes can be used to store data which is unique to a given class or type of functional module.

During power-up the PC system processor module 11 reads the MIDD bytes from each of the I/O modules 14 and 20 in the system chassis 13 and the remote I/O chassis 17. At this time PC system the processor module 11 uses the MIDD byte information in either of two ways depending upon whether the processor module is self configuring.

Heretofore, programmable controllers typically were not self configuring and required that the user manually enter information about each module within the system. This was typically done via the programming terminal 12 shown in FIG. 1. The information then was transferred from the terminal into the PC system processor module 11 where it was stored in a configuration table within its memory. When the programmable controller is initially powered up, these less sophisticated PC system processor modules obtain the MIDD byte information from each of the system chassis slots and of the remote I/O chassis slots. Once MIDD bytes were read from each of the rack slots, the PC system processor module interrogated the data initially to determine whether a module was inserted in that slot and if so, whether the module was functional. Such a determination can be made by inspecting the bits of MIDD byte 0 indicated in Table 7.

Then for each module present in the system, MIDD bytes 2 and 3 were compared with the module identification designation provided by the user during system configuration. If the user provided module information did not coincide with that read from the MIDD bytes, a system error is declared and a warning message presented to the user via terminal 12 or other appropriate warning device.

MIDD bytes 4 and 5 identifying the version of the I/O module's hardware and firmware can also be compared with similar version information provided by the user to determine if the proper module is within a give slot. In most instances a discrepancy in the module version information between that furnished by the user and that indicated by the MIDD bytes does not cause a system error. Typically modules of different versions are interchangeable without causing functional problems. Thus, a discrepancy in the version information still is presented in a message to the user via terminal 12 but does not cause a shut down of the programmable controller.

PC system processor modules 11 can be self configuring by using the MIDD byte information to determine the type of module within each slot. Thus, when power is initially applied to a programmable controller 10 having a self-configuring PC system processor module, the power-up routine also interrogates each slot in the various chassis to obtain MIDD information from any module which may be in that slot. The acquired information then is used by the processor module 11 to configure the system and set up the specific types of data transfer which legitimately may be performed with each module.

As with the less sophisticated modules, MIDD byte 0 is used to determine whether a functional module 14 or 20 is located in a given slot and whether such a module is operating properly. MIDD byte 1 is then used to determine the communication capabilities of the module. From MIDD byte 1, the PC system processor module 11 also determines whether the specific module 14 or 20 handles discrete input data or discrete output data and the number of bytes of such discrete data. This information is then employed by the self configuring PC system processor module 11 to determine the communication procedures to use in order to exchange data with the module. For example, if file transfer mode capability exists at the module, whether it requires the conventional technique using a module control byte (MCB) as disclosed in the Struger '924 patent or whether a module utilizes the improved ADS file transfer technique.

MIDD bytes 2 and 3 are used to determine the exact type of I/O module in the slot while MIDD bytes 4 and 5 identify the particular versions of that modules hardware and firmware. In a self configuring system, the PC system processor module can adapt to different module version so that updated modules of the same type do not have to be compatible with earlier module versions.

With both levels of sophistication the module identification provided by MIDD bytes 2 and 3 can be used to access a look-up table which coverts the binary numerical identification of the module 14 and 20 into an alphanumeric identification which corresponds to the manufacturers catalogue designation for the specific I/o module. The information obtained from the look-up table (not shown) can be sent to the terminal 12 for display to the user in an easily understood fashion which utilizes the manufacturers catalogue designations for the modules as opposed to the binary encoded form as the information is stored within the memory of the programmable controller. Similarly, the hardware and firmware revisions stored within MIDD bytes 4 and 5 can be sent by the PC system processor module 11 to the terminal 12 for display to the user.

Typically, after the power-up sequence has either verified the MIDD byte information with respect to the users supplied configuration information or configured the PC system processor module, MIDD bytes 1-7 need not be read again from the module slots. Under normal operating practices, a module will not be removed from a chassis 13 or 17 without removing power from the programmable controller system. Therefore, the identification of the modules will not have to be verified unless power is removed and reapplied to the chassis.

However, the PC system processor module 11 during normal operation of the programmable controller periodically, reads MIDD byte 0 from each chassis slot to determine whether a module within that slot is still functioning properly. As noted above with respect to the description of MIDD byte 0 in table 7, bits of this byte indicate different fault conditions. If upon reading MIDD byte 0, the PC system processor module 11 finds a fault condition being indicated, the appropriate diagnostic bytes, indicated in table 5 can be read from the module to determine the specific nature of the fault condition.

Figure 5:
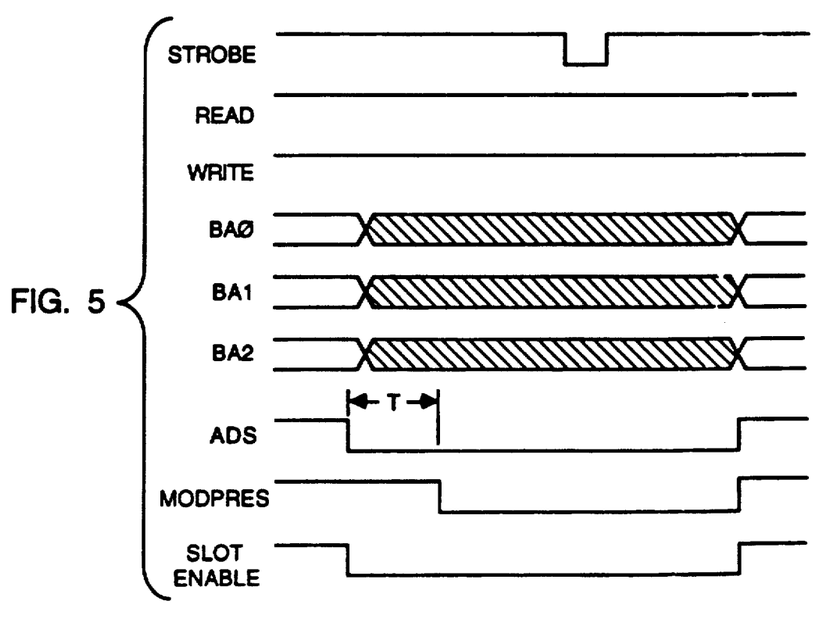
FIG. 5 is a timing diagram of signals used to read module identification information from a functional module.

The process by which the MIDD bytes information is obtained from each of the modules, has been specifically designed so as not to conflict with the ability to utilize older type I/O modules, without MIDD byte capability, in the programmable controller system. In order to read the MIDD information, the processor within the PC system processor module 11 sends the address of the slot containing the module to the backplane control circuit 41. A slot address decoder within that circuit 41 responds to the slot address by producing a true (low level) signal on the appropriate slot enable line as shown in FIG. 5. Since the obtaining of MIDD information is always a read operation and a write operation can not be made to the MIDD byte area, both the READ and the WRITE signal lines carry a false (high level) signal. The ADS control line goes true and the byte address lines (BA$\phi$-BA2) carry the address of the particular MIDD byte to be read. A comparison of FIG. 5 with FIG. 4 indicates a similarity between the reading of the MIDD byte information and the ADS file transfer technique, with the exception that the file transfer technique requires either the READ or the WRITE line to be true. By maintaining both the READ and the WRITE lines at a false level when both the ADS and the SLOT ENABLE lines are true, is distinguished the MIDD byte reading operation from other data transfer operations conducted by the backplane controller.

The signals are transmitted across the backplane 16 and 18 and to the backplane interface circuit 34 of the module in the selected slot. The true SLOT ENABLE signal activates that interface circuit 34 and the true ADS signal starts a timer in the module. The timer is preset to an interval T graphically depicted in FIG. 5. If at any time within interval T either the READ or the WRITE line is found to be true, the backplane interface circuit 34 within the I/O module enters the appropriate data transfer mode. However, if interval T elapses without either the READ or the WRITE line going true, the backplane interface circuit 34 within the selected I/O module 20 enters the MIDD byte reading mode of operation.

In the MIDD byte reading mode, the backplane interface circuit 34 obtains the MIDD byte designated by the address on lines BA$\phi$-BA2 and applies the MIDD byte to data buffers coupled to the I/O data lines on the backplane. This transmits the addressed MIDD byte over the backplane to the PC system processor module 11. At the expiration of interval T after the ADS line goes low, the module backplane interface circuit 34 drives the MODPRES line low to provide an unambiguous indication that a module is present in the addressed slot. Since the MIDD byte being read could have all high level bits, the MIDD byte by itself does not provide a conclusive indication that a module is present.

If more than one MIDD byte is to be read, this sequence is repeated with the byte address bits on lines BA$\phi$-BA2 changed between each iteration. In order to select another slot from which to read the MIDD bytes, the processor 40 within the PC system processor module 11 sends a different slot address to the backplane control circuit 41 to activate a different slot enable line.

I claim:

1. A functional module for exchanging data with a processor of a programmable controller over a set of buses which include a data bus, an address bus, a READ signal conductor, a WRITE signal conductor, a module enable signal conductor, and identification enable signal conductor, the functional module comprising:

means for storing a plurality of data bytes identifying characteristics of the functional module; and means for transmitting the data identifying characteristics of the functional module over the data bus to the processor in response to logically true signals on the module enable signal conductor and the identification enable signal conductor, logically false signals on the READ signal conductor and WRITE signal conductor, and an address signal on the address bus that identifies one of the plurality of data bytes to transmit.

2. The functional module as recited in claim 1 wherein said means for storing contains a byte, the bits of which indicate whether the module is functional and whether predefined error conditions have occurred.

3. The functional module as recited in claim 1 wherein said means for storing contains a byte which indicates which of a plurality of methods for exchanging data over the data bus with the processor can be performed by the functional module.

4. The functional module as recited in claim 1 wherein said means for storing contains at least one byte that identifies the type of functional module.

5. The functional module as recited in claim 4 wherein said means for storing contains a byte which specifies a version designation of the identified type of functional module.

6. The functional module as recited in claim 1 wherein the set of buses further includes a control line for carrying a signal which indicates the presence of a module; and said means for transmitting the data identifying characteristics of the functional module further transmits the signal which indicates the presence of a module over the control line in response to the logically true signal on the module enable signal conductor.

7. A functional module for exchanging data with a processor of a programmable controller over a set of signal lines which include a data bus, a READ signal conductor, a WRITE signal conductor, a module enable signal conductor, and a data transfer control signal conductor; the functional module comprising:
   means for storing data which data identify characteristics of the functional module;
   a first means for transmitting data over the data bus in response to logically true signals on the READ signal conductor and the module enable signal conductor; and
   a second means for transmitting the data identifying characteristics of the module over the data bus to the processor in response to a logically true signal on the module enable signal conductor, logically false signals on the READ signal conductor and the WRITE signal conductor, and a predefined signal on the data transfer control signal conductor.

8. The functional module as recited in claim 7 wherein:
   the set of signal lines further includes an address bus;
   said means for storing has a plurality of storage locations each being designated by a unique address; and
   said second means for transmitting responds to signals received from the address bus by obtaining from said means for storing a specific item of the indentifying characteristics of the functional module, which item is data to be transmitted over the data bus.

9. A functional module for exchanging data with a control program processor over a set of signal lines which include a data bus, a READ signal conductor, a WRITE signal conductor, a module enable signal conductor, and a data transfer control signal conductor; the functional module comprising:
   means for storing data identifying characteristics of the module;
   a means for receiving data from the data bus in response to logically true signals on the WRITE signal conductor and the module enable signal conductor; and
   a means for sending the data identifying characteristics of the module over the data bus to the processor in response to a logically true signal on the module enable signal conductor, logically false signals on the READ signal conductor and the WRITE signal conductor, and a predefined signal on the data transfer control signal conductor.

10. The functional module as recited in claim 9 wherein:
    the set of buses further includes an address bus;
    said means for storing has a plurality of storage locations each being designated by a unique address; and
    said means for sending responds to signals received from the address bus by obtaining from said means for storing a specific item of the indentifying characteristics of the functional module, which item is data to be transmitted over the data bus.

11. In a programmable controller for operating machinery in response to execution of a control program and having at least one functional module connected to the machinery, an improvement comprising:
    a chassis having a plurality of slots for supporting functional modules and a backplane with a data bus, a READ signal conductor, a WRITE signal conductor, a module enable signal conductor for each slot and a data transfer mode signal conductor, said chassis further including a means associated with each slot for connecting a functional module supported in that slot to the data bus and signal conductors;
    a backplane controller electrically coupled to the data bus and signal conductors of the backplane, and comprising:
    a) a first means for exchanging discrete bytes of data over the data bus with a given functional module by applying a logically true signal to the module enable signal conductor for a slot in which the given module is located, applying a logically true signal to one of the READ and WRITE signal conductors depending upon in which direction data is being exchanged, applying a logically false signal to the other of the READ and WRITE signal conductors, and applying a first logic level to the data transfer mode signal conductor;
    b) a second means for exchanging a file of data over the data bus with a selected functional module by applying a logically true signal to the module enable signal conductor for a slot in which the selected module is located, applying a logically true signal to one of the READ and WRITE signal conductors depending upon in which direction data is being exchanged, applying a logically false signal to the other of the READ and WRITE signal conductors, and applying a second logic level to the data transfer mode signal conductor; and
    c) a means for reading module characteristic data over the data bus from a chosen functional module by applying a logically true signal to the module enable signal conductor for a slot in which the chosen functional module is located, applying logically false signals to both the READ and WRITE signal conductors, and applying a predefined logic level to the data transfer mode signal conductor.

12. The programmable controller as recited in claim 11 wherein:
    the backplane of said chassis further includes an address bus; and
    said means for reading also applies, to the address bus, an address of a storage location in the chosen functional module at which is stored module characteristic data to be read.

13. The programmable controller as recited in claim 11 further comprising a given functional module electrically coupled to the backplane, and comprising:
  means for storing data identifying characteristics of the given functional module;
  a first means for transmitting data over the data bus in response to logically true signals on the READ signal conductor and the module enable signal conductor for a slot; and
  a second means for transmitting the data identifying characteristics of the given functional module over the data bus in response to a logically true signal on the module enable signal conductor for a slot in which the given functional module is located, logically false signals on both the READ and WRITE signal conductors, and the predefined logic level on the data transfer mode signal conductor.

14. The programmable controller as recited in claim 13 wherein:
  the backplane of said chassis further includes an address bus;
  said means for reading also applies an address to the address bus; and
  the given functional module has a plurality of storage locations in said means for storing, and said second means for transmitting reads data from a specific location in response an address received over the address bus.

15. The programmable controller as recited in claim 11 further comprising a given functional module electrically coupled to the backplane, and comprising:
  means for storing data identifying characteristics of the given functional module;
  means for receiving data from the data bus in response to logically true signals on the WRITE signal conductor and the module enable signal conductor for a slot; and
  means for sending the data identifying characteristics of the given functional module over the data bus in response to a logically true signal on the module enable signal conductor for a slot in which the given functional module is located, logically false signals on both the READ and WRITE signal conductors, and the predefined logic level on the data transfer mode signal conductor.

16. The programmable controller as recited in claim 15 wherein:
  the backplane of said chassis further includes an address bus;
  said means for reading also applies an address to the address bus; and
  the given functional module has a plurality of storage locations in said means for storing, and said means for sending reads data from a specific location in response to an address received over the address bus.

17. For a programmable controller with a processor module and at least one functional module in a chassis which has a plurality of slots for supporting functional modules and which connects the modules with a data bus, a READ signal conductor, a WRITE signal conductor, a module enable signal conductor for each slot, and a data transfer mode signal conductor; a method by which reading of characteristic data from a given functional module is initiated comprising:
  the processor module applying a logically true signal to the module enable signal conductor for a slot in which the given functional module is located;
  the processor module applying logically false signals to both the READ and WRITE signal conductors; and
  the processor module applying a predefined signal to the data transfer mode signal conductor.

18. The method as recited in claim 17 wherein said chassis further includes an address bus; and further comprising the step of applying, to the address bus, an address of a storage location in the given functional module.

* * * * *